No. 837,845. PATENTED DEC. 4, 1906.
K. KIEFER.
FILTERING ELEMENT.
APPLICATION FILED JUNE 23, 1905.

Witnesses. Inventor.
G. W. Worden Karl Kiefer
E. J. Appleton

UNITED STATES PATENT OFFICE.

KARL KIEFER, OF CINCINNATI, OHIO.

FILTERING ELEMENT.

No. 837,845. Specification of Letters Patent. Patented Dec. 4, 1906.

Original application filed March 6, 1903, Serial No. 146,596. Divided and this application filed June 23, 1905. Serial No. 266,642.

*To all whom it may concern:*

Be it known that I, KARL KIEFER, a citizen of the United States, and a resident of Cincinnati, in the county of Hamilton and State of Ohio, have invented a new and useful Improvement in Filtering Elements, of which the following is a specification.

This is a divisional application divided from my application, Serial No. 146,596, filed March 6, 1903, for filtering apparatus.

The object of this invention is to produce a single-pan liquid conductor that takes up little space in the filter apparatus and can be easily built and operated.

The invention is illustrated in the accompanying drawings, of which—

Figure 1:
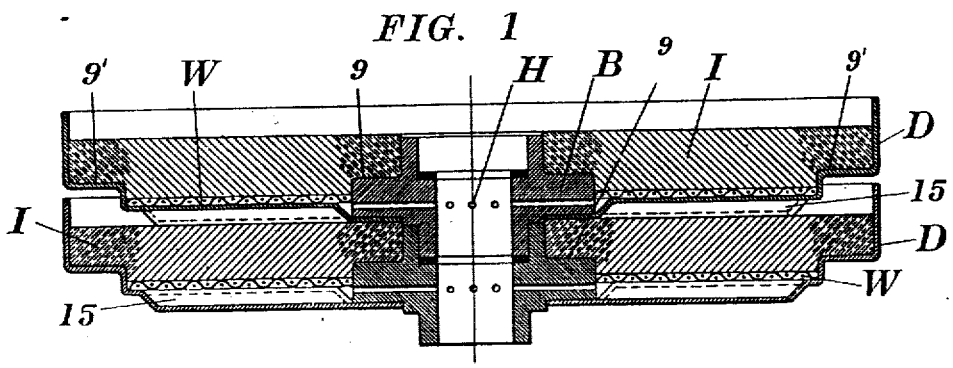
Figure 2:
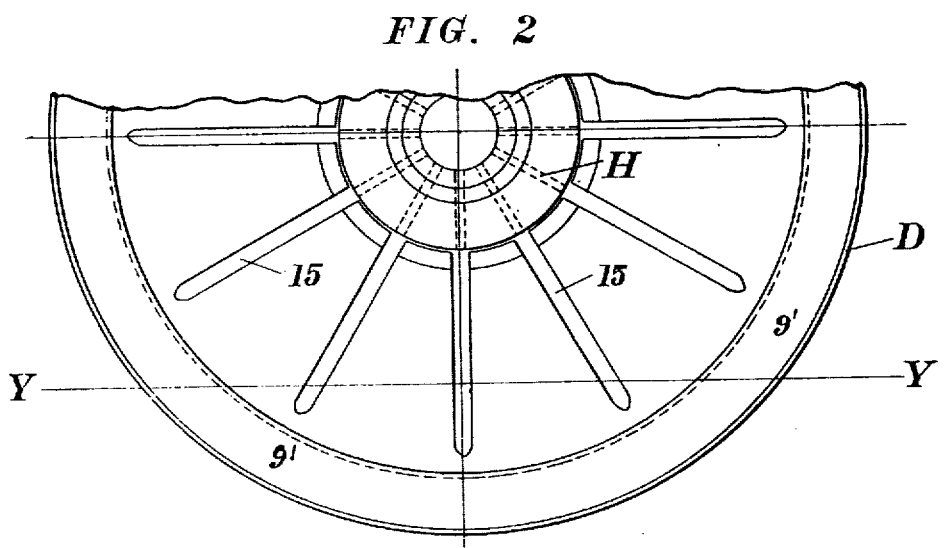
Figure 3:
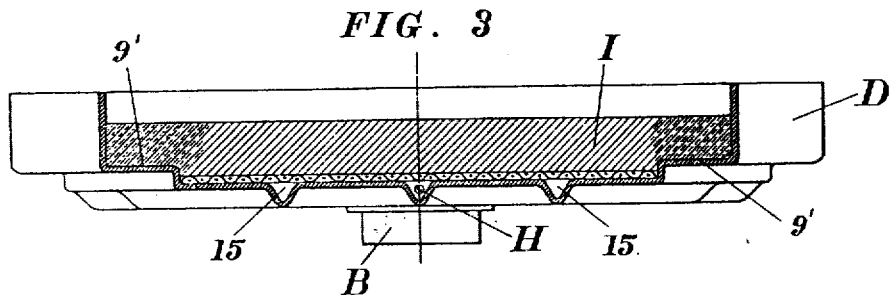

Figure 1 shows two superposed pans in cross-section filled with filter mass. Fig. 2 shows in plan part of the pan with filter mass and screen removed. Fig. 3 shows a cross-section from one of the pans at a different plane of section than Fig. 1.

The pan consists of a sheet-metal body D, a cast-metal hub B, the latter with perforations H, terminating in a large central hole.

W is a screen of the kind I have termed "fiber retaining," about one-sixteenth inch thick and from forty to fifty wires to the inch, commonly woven in the style which is called "twilled."

9 is a horizontal and protruding ring-shaped surface connected to the hub B.

9' is a peripheral protruding surface connected to the sheet-metal part D. The ring-shaped space between the two is filled out by the wire screen W. The filter mass is called I. Channels 15 are punched into the sheet-metal part of the pan, as shown in all the figures, and are plainly visible in cross-section in Fig. 3.

The fiber-retaining screen W is in contact with the plane part of the pan, and the liquid that issues clear from the filter-layer I moves between the capillary conduits produced by means of the plane bottom of the pan and the meshes of the mentioned screen and in some filters would be sufficient to deliver all the filtered liquid to the filtering-pan through the holes H. If an especially large machine is to be made, and for a very easy outlet, these grooves 15 are additional means for conducting the liquid to the center. They fulfil in construction, as shown, another purpose, and this is the pressing of the filter layer I beneath the pan against the ring-shaped surfaces 9 and 9' and the filtering-mat W of the lower neighboring pan and obviates the use of coarse-wire screens.

What I claim as my invention, and desire to secure by Letters Patent, is—

1. In a filter, the combination of a disk-shaped filtering layer of compressed fibrous pulp, within a pan having a vertical border, a peripheral and horizontal surface of a width at least as wide as the thickness of the filtering layer at its edge, such surface parts tightly connected to said vertical border, said pan having a ribbed bottom and a fiber-retaining mat, the latter in contact with such ribbed bottom and filtering layer.

2. In a filter, the combination of a disk-shaped filtering layer of compressed fibrous pulp, within a pan having a vertical border, a peripheral and horizontal surface of a width at least as wide as the thickness of the filtering layer at its edge, such surface parts tightly connected to said vertical border, said pan having a corrugated bottom and open-work mats on both sides of such corrugated bottom.

3. In a filter, the combination of a disk-shaped filtering layer of compressed fibrous pulp, within a pan having a vertical border, a peripheral and horizontal surface of a width at least as wide as the thickness of the filtering layer at its edge, such surface parts tightly connected to said vertical border, said pan having a corrugated imperforate bottom and open-work mats on both sides of such corrugated bottom.

In testimony whereof I have signed my name to this specification in the presence of two subscribing witnesses.

KARL KIEFER.

Witnesses:
 E. J. APPLETON.
 G. W. WERDEN